United States Patent
Iwasa et al.

(10) Patent No.: US 10,712,363 B2
(45) Date of Patent: Jul. 14, 2020

(54) SCANNING PROBE MICROSCOPE

(71) Applicant: HITACHI HIGH-TECH SCIENCE CORPORATION, Tokyo (JP)

(72) Inventors: Masayuki Iwasa, Tokyo (JP); Yoshiteru Shikakura, Tokyo (JP); Shinya Kudo, Toyko (JP); Toshihiro Ueno, Toyko (JP)

(73) Assignee: HITACHI HIGH-TECH SCIENCE CORPORATION, Tokyo (JP)

( * ) Notice: Subject to any disclaimer, the term of this patent is extended or adjusted under 35 U.S.C. 154(b) by 0 days.

(21) Appl. No.: 16/257,226

(22) Filed: Jan. 25, 2019

(65) Prior Publication Data
US 2019/0234992 A1  Aug. 1, 2019

(30) Foreign Application Priority Data

Jan. 26, 2018 (JP) .................. 2018-011262

(51) Int. Cl.
| | |
|---|---|
| *G01Q 20/02* | (2010.01) |
| *G01Q 30/06* | (2010.01) |
| *G06T 5/50* | (2006.01) |
| *G06T 7/12* | (2017.01) |
| *G01Q 60/36* | (2010.01) |
| *G01Q 30/04* | (2010.01) |

(52) U.S. Cl.
CPC ............ *G01Q 20/02* (2013.01); *G01Q 30/04* (2013.01); *G01Q 30/06* (2013.01); *G01Q 60/363* (2013.01); *G06T 5/50* (2013.01); *G06T 7/12* (2017.01); *G06T 2207/10056* (2013.01)

(58) Field of Classification Search
CPC ........ G01Q 20/02; G01Q 20/30; G01Q 20/04; G01Q 20/06; G01Q 60/363; G06T 7/12; G06T 5/50; G06T 2207/10056
See application file for complete search history.

(56) References Cited

U.S. PATENT DOCUMENTS

| | | | | |
|---|---|---|---|---|
| 5,805,448 | A * | 9/1998 | Lindsay ................ | B82Y 35/00 250/307 |
| 9,150,415 | B2 * | 10/2015 | Zhou ..................... | B82Y 35/00 |
| 2007/0033991 | A1 * | 2/2007 | Rice ...................... | G01Q 30/04 73/105 |
| 2010/0235955 | A1 * | 9/2010 | Humphris ............. | G01Q 20/02 850/6 |
| 2017/0322234 | A1 * | 11/2017 | Arai ...................... | G01Q 30/04 |

FOREIGN PATENT DOCUMENTS

JP          11-094851          4/1999

* cited by examiner

*Primary Examiner* — David E Smith
(74) *Attorney, Agent, or Firm* — Holland & Hart LLP

(57) ABSTRACT

Provided is a scanning probe microscope with which measurement data and a distribution image of differential data of the measurement data can be displayed selectively or together, an edge enhancement image can be obtained, and user convenience is improved. A scanning probe microscope (200) includes: a distribution image calculator (40a) configured to calculate a one-dimensional or two-dimensional first distribution image (201) of measurement data, and a one-dimensional or two-dimensional second distribution image (202) of differential data of adjacent data elements of the measurement data; and a display controller (40b) configured to instruct the distribution image calculator to calculate at least one of the first distribution image or the second distribution image, and to display the calculated distribution image on a predetermined display.

8 Claims, 12 Drawing Sheets

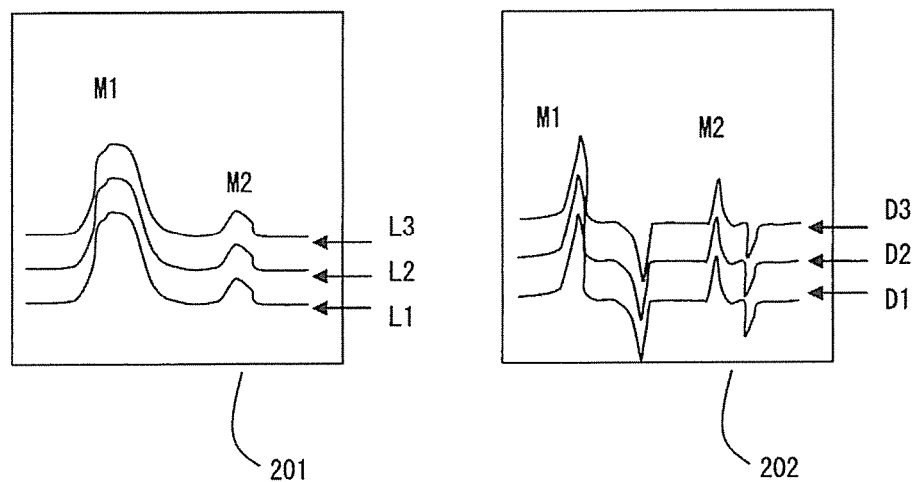
FIG. 4
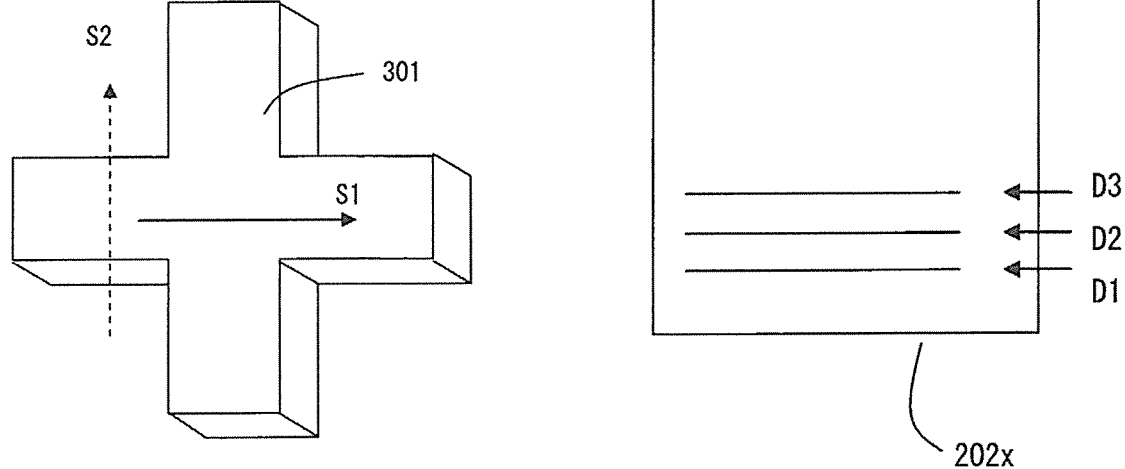
FIG. 5
FIG. 6

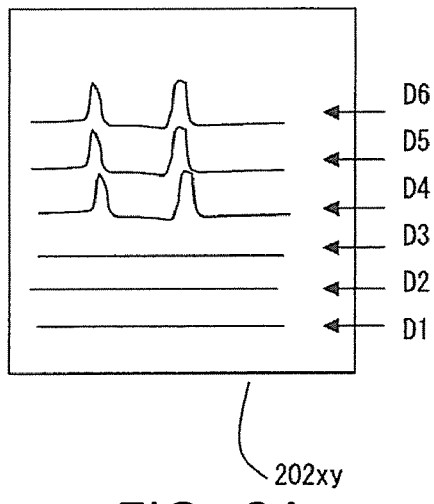
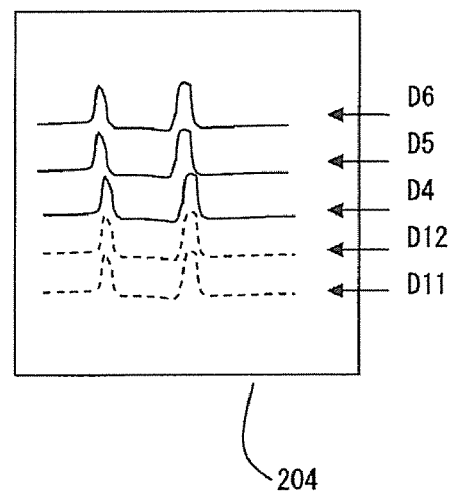
FIG. 9A            FIG. 9B
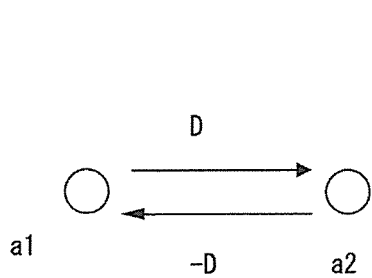
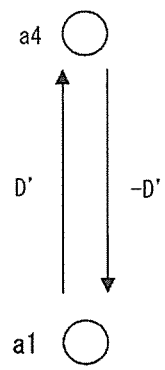
FIG. 10A            FIG. 10B

SHAPE IMAGE P1

P1 + D

P1₋D

P1₊D'

P1₋D'

SHAPE IMAGE P2

P2 +D

P2 −D

P +D'

P2-D'

SCANNING PROBE MICROSCOPE

CROSS REFERENCE TO RELATED APPLICATION

This application claims the benefit of Japanese Patent Application No. JP 2018-011262, filed Jan. 26, 2018, which is hereby incorporated by reference in its entirety into this application.

BACKGROUND OF THE INVENTION

1. Field of the Invention

The present invention relates to a scanning probe microscope, which is configured to detect physical interaction between a sample and a probe, and use the physical interaction in controlling a distance between the sample and the probe and acquiring physical measurement data obtained by the interaction.

2. Description of the Related Art

Scanning probe microscopes (SPMs) are configured to bring a probe closer to or into contact with a sample surface, to thereby measure a surface shape and physical properties of a sample. There are many kinds of measurement modes of the scanning probe microscopes, such as a scanning tunneling microscope (STM), and a scanning atomic force microscope (AFM). For the most often used AFM, the following measurement modes are known: (1) a contact mode in which atomic force between the probe and the sample is detected as bending of a cantilever, and the surface shape of the sample is measured while keeping the atomic force constant, and (2) a method in which the cantilever is forcedly vibrated at around a resonance frequency by a piezoelectric element or other such element, and a shape of the sample is measured using a change in amplitude of the probe due to intermittent force that acts between the probe and the sample when the probe is brought into contact with or closer to the sample (hereinafter referred to as "dynamic force mode (DFM measurement mode)" as appropriate), for example.

Those scanning probe microscopes are configured to detect a signal indicating a displacement of the cantilever, and measure a sample surface shape and physical measurement data obtained by interaction between the cantilever and the sample when a physical quantity (force and a vibration amplitude) between the cantilever and a surface of the sample is kept constant based on the signal, and when the probe is scanned relatively along the surface of the sample.

Incidentally, a topographic image (shape image) of the sample surface acquired using an SPM, for example, is generally in high/low coloration and expressed as being dark in low places and light in high places. However, in a related-art shape image, when the sample surface has large asperities and small asperities, the small asperities have low contrast and are hard to see with coloration adapted for highness/lowness of the large asperities, while the large asperities have contrast over the range used with coloration adapted for highness/lowness of the small asperities. Thus, it is difficult to express both asperities in the same image.

Meanwhile, in the field of image processing, there has hitherto been used a technology called edge enhancement (image enhancement), with which a differential image of adjacent image data elements is generated to make an image easier to see. However, in the field of the scanning probe microscope, differential data has been used only for removing a strain component in an image to improve accuracy of the image, for example (see Japanese Patent Application Laid-open No. Hei 11-94851). It is assumed that this is because the edge enhancement in the field of the scanning probe microscope is performed by obtaining an error signal image using an error signal as a displacement signal in a scanning direction of the cantilever in an AFM or a displacement signal of the vibration amplitude in the scanning direction of the cantilever in a DFM.

Therefore, when it is desired to perform edge enhancement by taking a difference of measurement data of a related-art scanning probe microscope, it is required to perform differencing on the read measurement data with other software or the like, and display the result on a screen separately from the measurement data, for example, and hence the operation is complicated and inconvenient.

Moreover, depending on the application, there are a case in which it is desired to acquire and display only the measurement data, a case in which it is desired to acquire and display the differential data, and a case in which it is desired to display both of the measurement data and the differential data on the screen. In order to satisfy those various demands, when the differential data is always calculated, for example, there are problems in that computer processing is wasted and a processing speed is reduced when the differential data is not required. Moreover, it is not possible to adapt to a case in which it is desired to selectively acquire the differential data only for a particular sample or surface shape.

Further, there has not been developed a scanning probe microscope in which both of the measurement data and the differential data are displayed on the screen.

Still further, the error signal image in the field of the scanning probe microscope is based on an error signal that is obtained when, in a so-called optical lever system, amounts of light that are received by quadrant cell photoreceivers configured to detect a displacement of the cantilever become uneven. The uneven amounts of light are, in other words, shifts from a control reference of the displacement, and it is essentially ideal that control is performed so as to eliminate the shifts. Therefore, the error signal image has smaller differences from the shape image as measurement accuracy becomes higher, and there is a problem in that it becomes harder to use the error signal image as edge enhancement means as the measurement accuracy becomes higher.

SUMMARY OF THE INVENTION

The present invention has been made to solve the above-mentioned problems, and therefore has an object to provide a scanning probe microscope with which measurement data and a distribution image of differential data of the measurement data can be displayed selectively or together, an edge enhancement image can be obtained irrespective of measurement accuracy, and user convenience is improved.

In order to achieve the above-mentioned object, according to one embodiment of the present invention, there is provided a scanning probe microscope including: a cantilever including a probe to be brought into contact with or closer to a surface of a sample; and a displacement detector configured to detect a signal indicating a displacement of the cantilever, the scanning probe microscope being configured to acquire measurement data obtained when a predetermined physical quantity between the cantilever and the surface of the sample is kept constant based on the signal, and when the probe is scanned relatively along the surface of the sample, the scanning probe microscope further including: a distribution image calculator configured to calculate a one-dimensional or two-dimensional first distribution image of the measurement data, and a one-dimensional or two-dimensional second distribution image of differential data of adjacent data elements of the measurement data; and a display controller configured to instruct the distribution image calculator to calculate at least one of the one-dimensional or two-dimensional first distribution image or the one-dimensional or two-dimensional second distribution image, and to display, on a predetermined display, the calculated at least one of the one-dimensional or two-dimensional first distribution image or the one-dimensional or two-dimensional second distribution image.

According to the scanning probe microscope, when the first distribution image consisting of the measurement data is hard to see, the second distribution image consisting of the differential data of the measurement data is calculated to obtain the edge enhancement image, to thereby make a distribution of physical quantities of the sample surface easier to see. In particular, with the use of the differential data, in contrast to the related-art scanning probe microscope using the error signal image, the second distribution image (edge enhancement image) is obtained irrespective of the measurement accuracy.

Moreover, when the first distribution image and the second distribution image are displayed on one display, as compared to the case in which one of the distribution images is displayed, the first distribution image as the original image (for example, a shape image) and the second distribution image consisting of the differential data can be compared on one screen, and hence more useful information can be obtained.

In the scanning probe microscope of one embodiment of the present invention, the display controller may be configured to display, when displaying both of the one-dimensional or two-dimensional first distribution image and the one-dimensional or two-dimensional second distribution image, the measurement data and the differential data at the same position at the same time.

According to the scanning probe microscope, the first distribution image and the second distribution image at the same position are displayed at the same time, with the result that a difference between the distribution images can be compared at the same position, and that even more useful information can be obtained.

The scanning probe microscope of one embodiment of the present invention may further include a calculation direction specification module configured to specify a data calculation direction, in which the one-dimensional or two-dimensional first distribution image and the one-dimensional or two-dimensional second distribution image are to be calculated, and the distribution image calculator maybe configured to calculate, along the data calculation direction specified by the calculation direction specification module, a distribution image to be displayed on the predetermined display, of the one-dimensional or two-dimensional first distribution image and the one-dimensional or two-dimensional second distribution image.

Depending on the data calculation direction, the first distribution image and the second distribution image may be reduced in contrast or the like and hence become harder to see, with the result that useful information may not be obtained in some cases. To address this problem, according to the scanning probe microscope, the first distribution image and the second distribution image are increased in contrast or the like and hence are made easier to see by changing the data calculation direction, with the result that even more useful information can be obtained.

The scanning probe microscope of one embodiment of the present invention may further include a subtraction order specification module configured to specify a subtraction order for a difference of adjacent data elements, in which the one-dimensional or two-dimensional second distribution image is to be calculated, and the distribution image calculator may be configured to calculate the one-dimensional or two-dimensional second distribution image in the subtraction order specified by the subtraction order specification module.

Depending on the data subtraction order, the second distribution image maybe reduced in contrast or the like and hence become harder to see, with the result that useful information may not be obtained in some cases. To address this problem, according to the scanning probe microscope, the second distribution image is inverted in lightness/darkness, is increased in contrast or the like, and hence is made easier to see by changing the subtraction order, with the result that even more useful information can be obtained.

In the scanning probe microscope of one embodiment of the present invention, the display controller may be configured to display the one-dimensional or two-dimensional second distribution image sequentially for each element of the differential data along one of a scanning direction and the data calculation direction, and the distribution image calculator may be configured to calculate, when at least one of the data calculation direction or the subtraction order is specified by at least one of the calculation direction specification module or the subtraction order specification module during display of the one-dimensional or two-dimensional second distribution image, the one-dimensional or two-dimensional second distribution image based on the specified at least one of the data calculation direction or the subtraction order.

According to the scanning probe microscope, with the second distribution image being displayed sequentially for each element of the differential data, at least one of the data calculation direction or the subtraction order can be changed immediately when it is felt that the second distribution image is reduced in contrast or the like and becomes harder to see, with the result that the subsequent second distribution image is made easier to see, and that useful information can be obtained.

In the scanning probe microscope of one embodiment of the present invention, the distribution image calculator may be configured to recalculate the one-dimensional or two-dimensional second distribution image of the measurement data before the specification based on the specified at least one of the data calculation direction or the subtraction order, and the display controller may be configured to display both of the recalculated one-dimensional or two-dimensional second distribution image and the one-dimensional or two-dimensional second distribution image after the specification.

According to the scanning probe microscope, with the second distribution image being displayed sequentially for each element of the differential data, the past (calculated) second distribution image that is felt as having been reduced in contrast or the like and hence having become harder to see is recalculated by changing at least one of the data calculation direction or the subtraction order, with the result that the past second distribution image is made easier to see, and that useful information can be obtained.

In the scanning probe microscope of one embodiment of the present invention, the display controller may be configured to display at least one of the measurement data or the differential data line by line in one of a scanning direction and the data calculation direction.

According to the scanning probe microscope, with at least one of the measurement data or the differential data being displayed line by line, at least one of the measurement data or the differential data can be seen immediately in real time. Moreover, when it is felt that at least one of the measurement data or the differential data is hard to see, action can be taken (at least one of the data calculation direction or the subtraction order can be changed) immediately.

According to one embodiment of the present invention, measurement data of the scanning probe microscope and a distribution image of differential data of the measurement data can be displayed selectively or together, an edge enhancement image can be obtained, and user convenience can be improved.

BRIEF DESCRIPTION OF THE DRAWINGS

FIG. 4 is a schematic diagram for illustrating a state in which both of a first distribution image and a second distribution image are displayed on one monitor.

FIG. 5 is a diagram for illustrating calculation directions of the second distribution image to be used when a sample has a cross-shaped projecting portion.

FIG. 6 is a schematic diagram for illustrating the second distribution image in a scanning direction of the sample of FIG. 5.

FIG. 9A and FIG. 9B are schematic diagrams for illustrating a mode in which, when a calculation direction is specified, recalculated second distribution images and second distribution images after the specification are displayed together.

FIG. 10A and FIG. 10B are diagrams for illustrating subtraction orders for a difference of data in calculating the second distribution image.

DESCRIPTION OF THE EMBODIMENTS

Now, embodiments of the present invention are described with reference to the drawings.

Figure 1A:
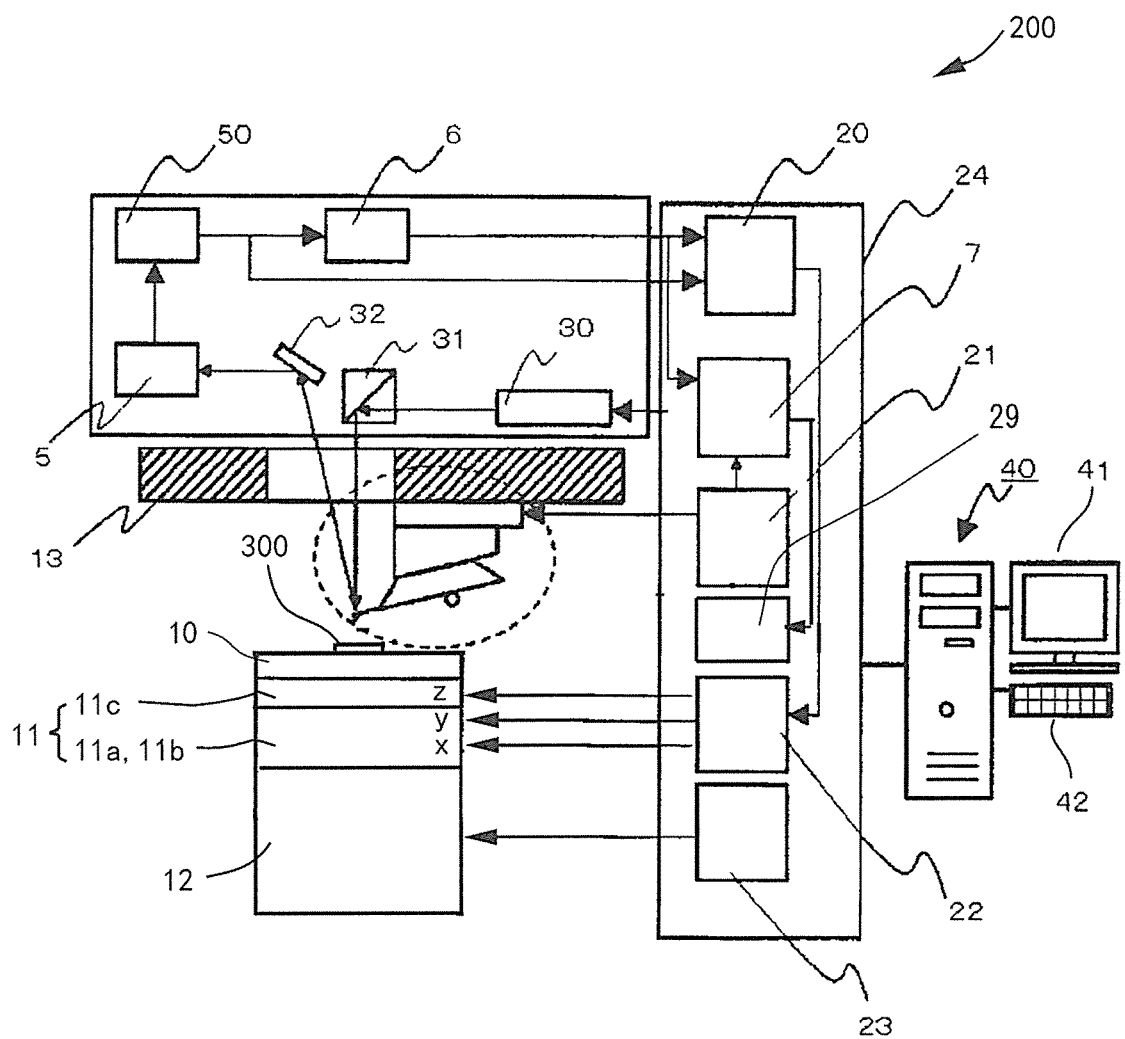
FIG. 1A and FIG. 1B are block diagrams of a scanning probe microscope according to an embodiment of the present invention.
Figure 1B:
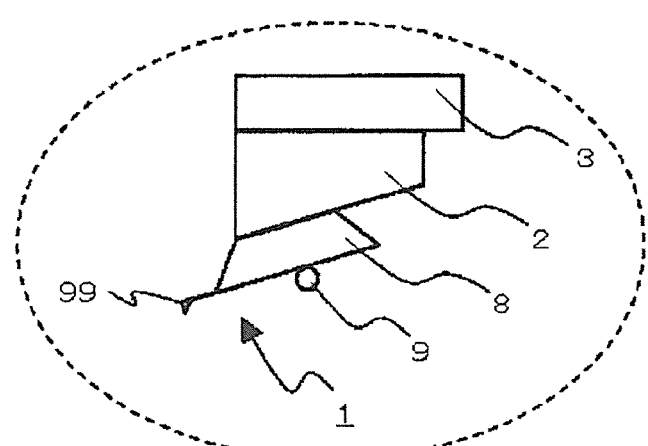

FIG. 1A and FIG. 1B are block diagrams of a scanning probe microscope 200 according to an embodiment of the present invention. FIG. 1A is a general diagram of the scanning probe microscope 200, and FIG. 1B is a partially enlarged view around a cantilever 1.

In FIG. 1A and FIG. 1B, the scanning probe microscope 200 includes the cantilever 1 having a probe 99 at a tip end thereof, a sample stage 10, on which a sample 300 is to be placed, a cantilever vibrator portion 3 configured to vibrate the cantilever 1, an excitation power supply (excitation signal generator) 21 configured to drive the cantilever vibrator portion 3, a displacement detector 5 configured to detect a signal indicating a displacement of the cantilever 1, an AC-DC conversion mechanism 6, a controller (a probe microscope controller 24 and a computer 40), and other such components.

The probe microscope controller 24 includes a frequency vibration characteristics detection mechanism 7.

The computer 40 includes a control board configured to control operation of the scanning probe microscope 200, a central processing unit (CPU), a ROM, a RAM, a hard disk drive, or other such storage, an interface, an operation device, and other such components. Moreover, a monitor (display) 41 and a keyboard 42 are connected to the computer 40.

The scanning probe microscope 200 is a sample scanning system in which the cantilever 1 is fixed to scan the sample 300 side.

The probe microscope controller 24 includes a Z control circuit 20, which is to be described later, the frequency vibration characteristics detection mechanism 7, the excitation power supply 21, an XYZ output amplifier 22, and a coarse movement control circuit 23. The probe microscope controller 24 is connected to the computer 40 and is capable of high-speed data communication. The computer 40 is configured to control operation conditions of the circuits in the probe microscope controller 24, and read and control measured data to achieve measurement of a surface shape and other physical properties of the surface, for example.

The probe microscope controller 24 is configured to amplify measurement data as appropriate, and acquire a sample surface shape and a physical quantity obtained by interaction between the cantilever and the sample.

A bias supply circuit 29 is configured to directly apply a bias voltage to the sample stage 10, and is used also in a Kelvin probe force microscope (KFM) configured to measure a surface potential between the probe 99 and the sample 300, for example.

The computer 40 corresponds to the "distribution image calculator", the "display controller", the "calculation direction specification module", and the "subtraction order specification module" in the appended claims.

A coarse movement mechanism 12 is configured to roughly move an actuator 11 and the sample stage 10 above the actuator 11 three-dimensionally, and its operation is controlled by the coarse movement control circuit 23.

The actuator (scanner) 11 is configured to move (finely move) the sample stage 10 (and the sample 300) three-dimensionally, and is a cylinder including two (biaxial) piezoelectric elements 11a and 11b configured to scan the sample stage 10 in x and y directions (in the plane of the sample 300), respectively, and a piezoelectric element 11c configured to scan the sample stage 10 in a z (height) direction. A piezoelectric element is an element in which crystals are deformed when applied with an electric field, and when the crystals are forcedly deformed by an external force, an electric field is generated. As the piezoelectric element, lead zirconate titanate (PZT), which is a type of ceramics, can be generally used, but a shape and an operation method of the coarse movement mechanism 12 are not limited thereto.

The piezoelectric elements 11a to 11c are connected to the XYZ output amplifier 22, and predetermined control signals (voltages) are output from the XYZ output amplifier 22 to drive the piezoelectric elements 11a and 11b in the x and y directions, respectively, and drive the piezoelectric element 11c in the z direction. An electric signal output to the piezoelectric element 11c is detected in the probe microscope controller 24, and is read as the above-mentioned "measurement data".

The sample 300 is placed on the sample stage 10, and the sample 300 is arranged to be opposed to the probe 99.

The cantilever 1 is in contact with a side surface of a cantilever tip portion 8 to form the structure of a cantilever spring. The cantilever tip portion 8 is pressed to a slope block 2 by a cantilever tip portion holder 9, and the slope block 2 is fixed to the vibrator portion 3. Then, the vibrator portion 3 is vibrated with an electric signal from the excitation power supply 21 to vibrate the cantilever 1 and the probe 99 at the tip end of the cantilever 1. Methods of vibrating the cantilever include a piezoelectric element, an electric field and a magnetic field, irradiation with light, and passing of an electric current, for example.

The vibrator portion 3 is fixed to a housing 13. The housing 13 has, in a portion directly above the cantilever 1, an opening for allowing light reflected by a dichroic mirror 31 and the light further reflected by a back surface of the cantilever 1 to pass therethrough.

Then, laser light enters the dichroic mirror 31 from a laser light source 30 to irradiate the back surface of the cantilever 1, and the laser light reflected by the cantilever 1 is reflected by a mirror 32, and is detected by the displacement detector 5. The displacement detector 5 is a quadrant photo detector, for example, and a vertical displacement amount (in the z direction) of the cantilever 1 is detected, by the displacement detector 5, as a change in optical path (incident position) of the laser reflected by the cantilever 1. In other words, a vibration amplitude of the cantilever 1 corresponds to an amplitude of an electric signal of the displacement detector 5.

The electric signal of the displacement detector 5 passes through a preamplifier 50 to be amplified in amplitude as appropriate, and is converted into a DC level signal corresponding to a magnitude of the amplitude by the AC-DC conversion mechanism 6.

The DC level signal of the AC-DC conversion mechanism 6 is input to the Z control circuit 20. The Z control circuit 20 transmits a control signal to a Z signal portion of the XYZ output amplifier 22 so as to match a target amplitude of the probe 99 in a DFM measurement mode, and the Z signal portion outputs a control signal (voltage) for driving the piezoelectric element 11c in the z direction. In other words, a displacement of the cantilever 1 caused by atomic force that acts between the sample 300 and the probe 99 is detected by the above-mentioned mechanism, and the piezoelectric element 11c is displaced so that the vibration amplitude of the probe 99 (cantilever 1) becomes the target amplitude to control force with which the probe 99 and the sample 300 are brought into contact with each other. Then, under this state, the piezoelectric elements 11a and 11b are displaced in the x and y directions by the XYZ output amplifier 22 to scan the sample 300 to map a shape and a physical property value of a surface of the sample 300.

Moreover, the DC level signal from the AC-DC conversion mechanism 6 is input to the frequency vibration characteristics detection mechanism 7 of the probe microscope controller 24. Further, the electric signal from the excitation power supply 21 is also input to the frequency vibration characteristics detection mechanism 7. The frequency vibration characteristics detection mechanism 7 processes a predetermined frequency vibration characteristics signal calculated based on the inputs from the AC-DC conversion mechanism 6 and the excitation power supply 21 to acquire, for example, sin, cos, and amplitude signals by lock-in detection, and transmit the signals to the computer 40.

Then, the probe microscope operates as follows. With respect to a displacement in the xy plane of the sample stage 10, on the computer 40, (i) a three-dimensional shape image is displayed based on displacement of the height of the sample stage 10, (ii) a phase image is displayed based on a phase value in a resonance state, (iii) an error signal image is displayed based on a difference of the vibration amplitude from the target value, and (iv) a multifunction measurement image is displayed based on the physical property value between the probe and the sample, to thereby perform analysis and processing.

Next, referring to FIG. 2 to FIG. 10B, features of the present invention are described. In one embodiment of the present invention, a one-dimensional or two-dimensional first distribution image of the measurement data and a one-dimensional or two-dimensional second distribution image of differential data of adjacent data elements of the measurement data are calculated and displayed selectively or together. Now, a case in which the measurement data is shape data is described as an example.

Figure 2:
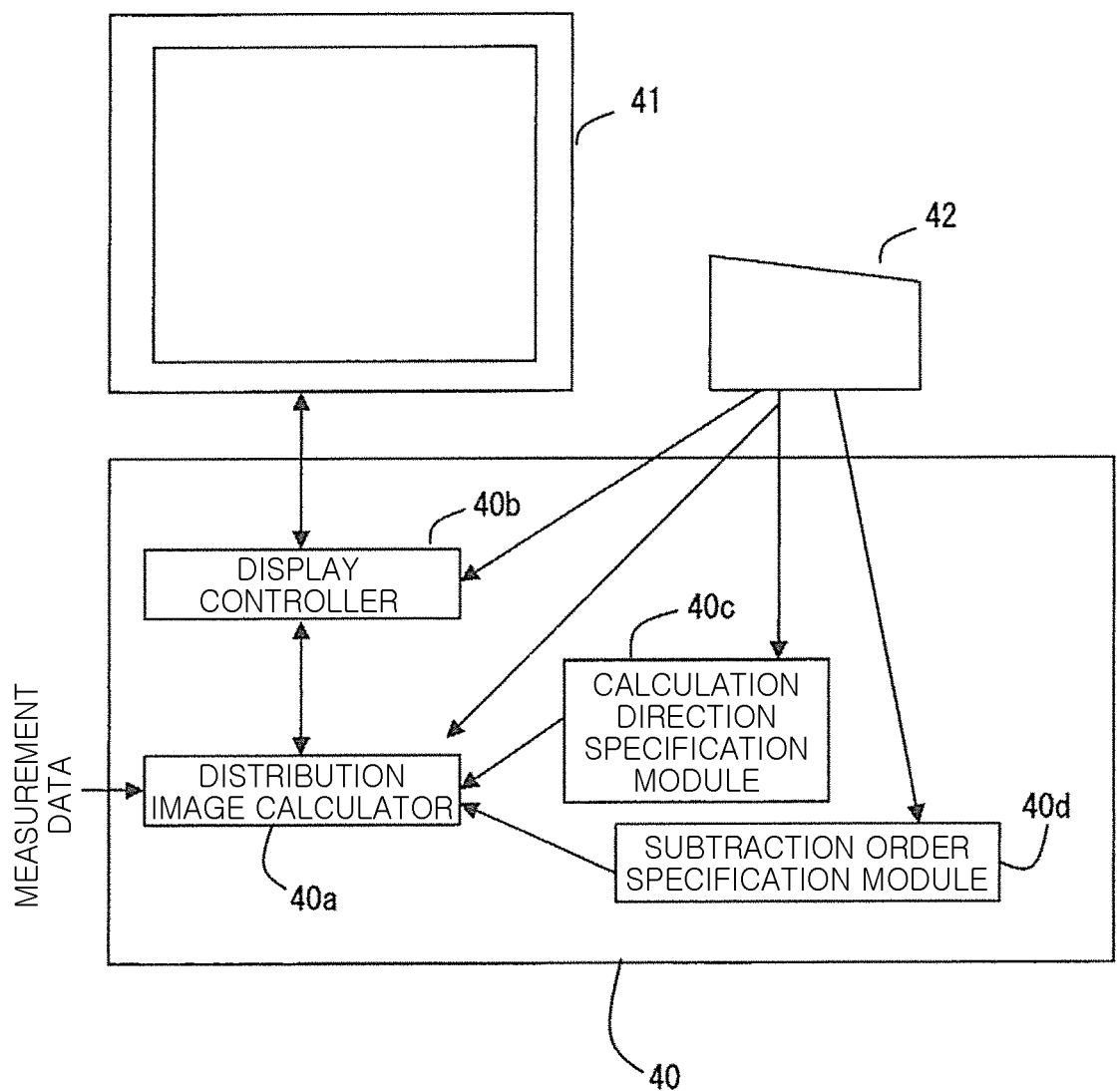
FIG. 2 is a block diagram of a computer of the scanning probe microscope.

As illustrated in FIG. 2, a display controller 40b issues an instruction to calculate a distribution image requested by a user through the keyboard 42. A distribution image calculator 40a reads the measurement data from the probe microscope controller 24, and calculates the distribution image specified from the display controller 40b.

Moreover, the distribution image calculator 40a calculates the first distribution image and the second distribution image in a calculation direction in accordance with an instruction from a calculation direction specification module 40c. Similarly, the distribution image calculator 40a calculates the second distribution image in a subtraction order in accordance with an instruction from a subtraction order specification module 40d.

The instructions from the calculation direction specification module 40c and the subtraction order specification module 40d are issued by the user through the keyboard 42.

Then, the display controller 40b displays the distribution image calculated by the distribution image calculator 40a on the monitor 41.

Next, a processing flow in the computer 40 is described.

Figure 3:
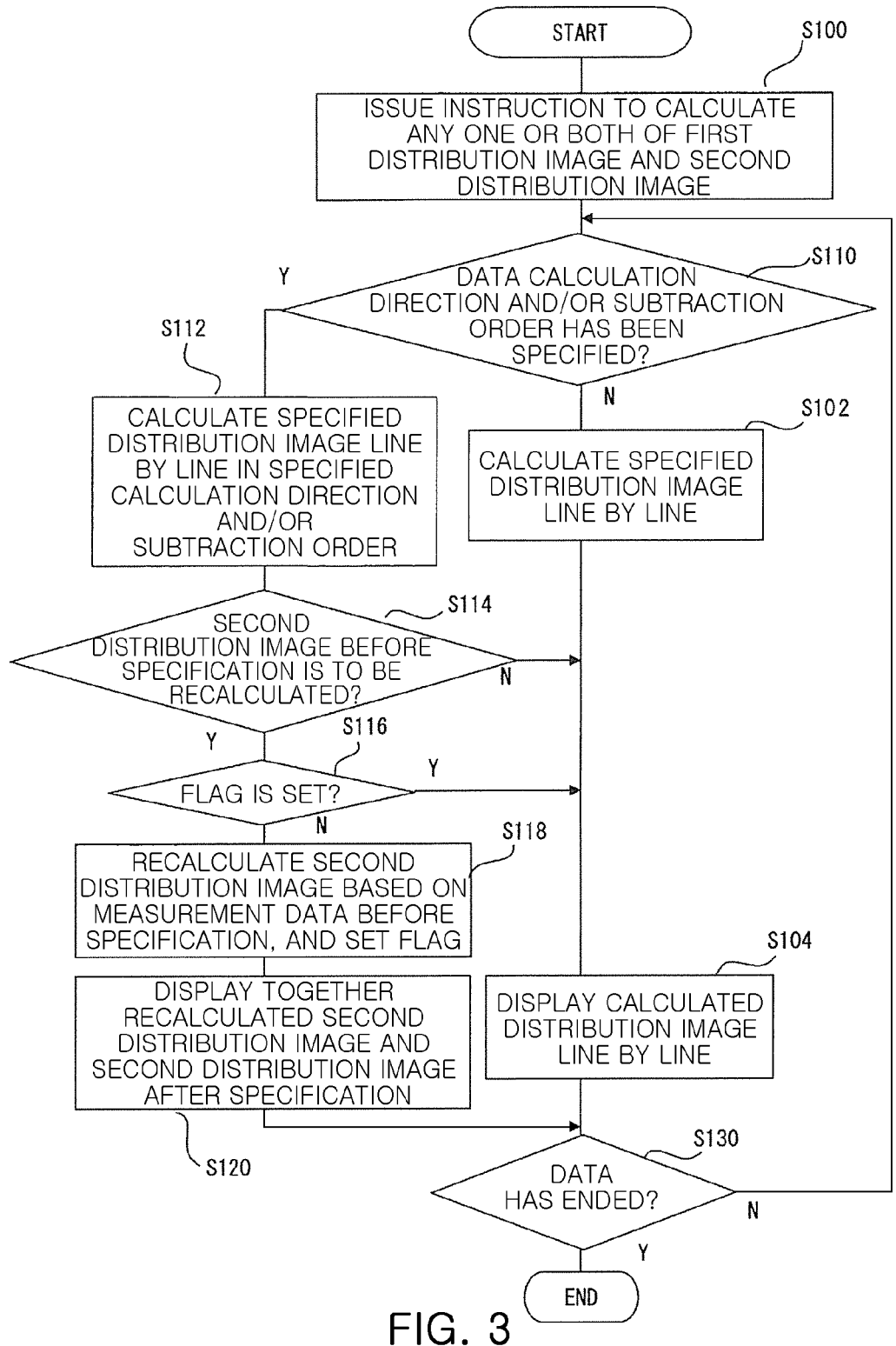
FIG. 3 is a chart for illustrating a processing flow in the computer of the scanning probe microscope.

In FIG. 3, when the user inputs a request to acquire (display) any one of the first distribution image and the second distribution image (in this example, both of the first distribution image and the second distribution image) through the keyboard 42, for example, the display controller 40b instructs the distribution image calculator 40a to calculate the requested distribution image (Step S100).

After determination processing in Step S110 to be described later, the distribution image calculator 40a calculates the specified distribution image line by line (Step S102).

The display controller 40b displays the calculated distribution image line by line on the monitor 41 (Step S104).

In this case, unless specified in Step S110 to be described later, in Step S102 and Step S104, the calculation direction and the subtraction order, which are to be described later, have default values (for example, the calculation direction is the same as a scanning direction). Moreover, when the calculation direction is the same as the scanning direction, one line corresponds to one scan line.

FIG. 4 is a schematic diagram for illustrating a state in which both of a first distribution image 201 and a second distribution image 202 are displayed on one monitor 41 by the processing of FIG. 3. L1 to L3 in the first distribution image 201 denote distribution images of one-dimensional measurement data for each line in the sated order. Similarly, D1 to D3 in the second distribution image 202 denote distribution images of one-dimensional differential data for each line in the stated order. Then, the lines are arranged chronologically to obtain two-dimensional distribution images of the measurement data and the differential data.

The first distribution image 201, which is a shape image, includes a large hill M1 and a small hill M2, and with coloration adapted for highness and lowness of the large asperities on two dimensions, there are problems such as the small hill M2 having low contrast and becoming hard to see.

To address those problems, through calculating and displaying the second distribution image 202 formed of the differential data of the adjacent measurement data elements, even when the large hill M1 and the small hill M2 are included in the same image, for example, a clear image 202 in which edges are enhanced to distinguish the hills M1 and M2 is obtained.

In particular, when the first distribution image 201 and the second distribution image 202 are displayed on one monitor 41, as compared to the case in which one of the distribution images is displayed, the first distribution image 201 as the original image (for example, a shape image) and the second distribution image 202 consisting of the differential data can be compared on one screen, and hence more useful information can be obtained.

In particular, of the first distribution image 201 and the second distribution image 202, when the measurement data and the differential data at the same position are displayed at the same time, a difference between the distribution images can be compared at the same position, and even more useful information can be obtained.

The expression "same position" as used herein may correspond to one pixel of the measurement data, for example, but with the display being generally performed for each scan line or other such line, one particular line of the measurement data and data of one line of the differential data based on the measurement data of the particular one line may be regarded as the same position.

Moreover, when the expression "at the same time" is used, in a case where one pixel of the measurement data is displayed sequentially, one pixel of the measurement data and one pixel of the differential data of pixels before and after the one pixel of the measurement data are displayed in association with each other at the same time. It should be noted, however, that with the display being generally performed for each scan line or other such line, one particular line of the measurement data and data of one line of the differential data may be displayed at the same time.

Moreover, without departing from the above-mentioned spirit, another unit of data may be displayed at the "same position" or at the "same time" (for example, two lines may be displayed at the same time as one unit).

Incidentally, as illustrated in FIG. 5, in a case where a sample 301 has a cross-shaped projecting portion, for example, when a scanning direction S1 is a direction parallel to one direction of the cross, and when a planar surface is scanned through the center of the cross of the projecting portion, no asperity information is obtained, and in addition, as illustrated in FIG. 6, a second distribution image 202x as the differential data may also be flat and contain no useful information.

Figure 7:
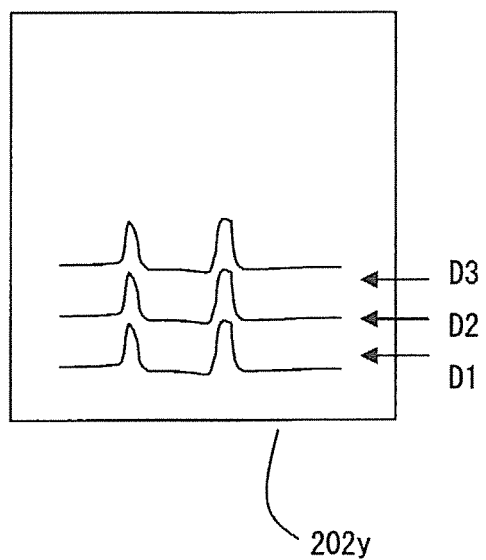
FIG. 7 is a schematic diagram for illustrating a second distribution image obtained when the calculation direction of the sample of FIG. 5 is set orthogonal to the scanning direction.

To address this problem, when a calculation direction S2, in which the first distribution image and the second distribution image are calculated, is set to a vertical direction crossing the cross, for example, instead of the same direction as the scanning direction S1, it can be ensured that a second distribution image 202y contain useful information as illustrated in FIG. 7.

The processing of FIG. 7 can be performed as in Step S110 to Step S114 of FIG. 3.

First, the distribution image calculator 40a determines, after Step S100 and before S102, whether a data calculation direction and/or a subtraction order has been specified (Step S110). The subtraction order is described later.

In this case, the calculation direction can be specified, for example, when the user inputs a calculation direction through the keyboard 42, and the calculation direction specification module 40c sets the calculation direction in the distribution image calculator 40a.

When the determination is "Yes" in Step S110, the processing proceeds to Step S112, and when the determination is "No", the processing proceeds to Step S102.

In Step S112, the distribution image calculator 40a calculates, of the first distribution image and the second distribution image, the distribution image (in this example, both of the first distribution image and the second distribution image) displayed on the display line by line along the specified calculation direction.

Subsequently, when the determination is "No" in Step S114, the processing proceeds to Step S104, in which the distribution image calculated in the specified calculation direction is displayed.

Figure 8:
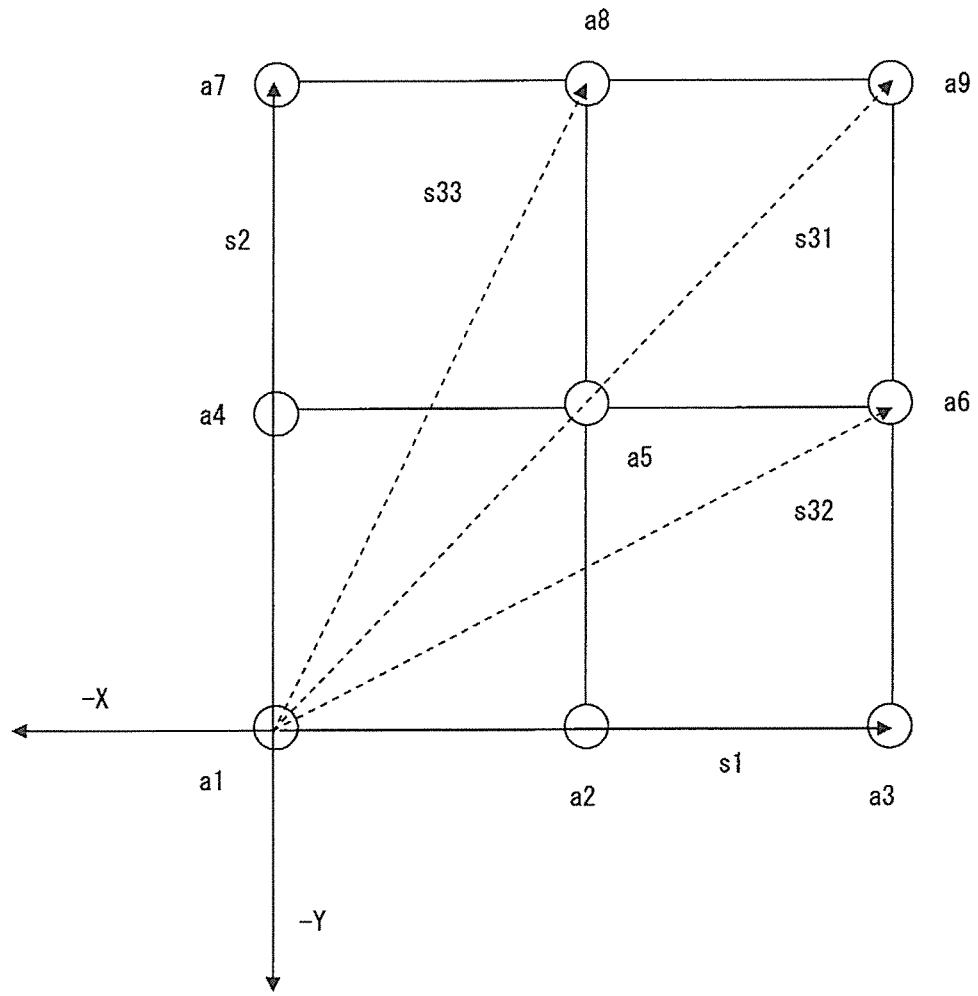
FIG. 8 is a graph for showing an example of data calculation directions.

In FIG. 8, an example of data calculation directions is illustrated. In FIG. 8, a1 to a9 denote individual measurement data elements.

When a direction in which the measurement data elements a1, a2, and a3 are lined is the scanning direction S1, there are a large number of calculation directions different from the scanning direction S1, which are not limited as long as the individual measurement data elements are connected in line in the direction, and include, in addition to the calculation direction S2 orthogonal to the scanning direction S1, a calculation direction S31, which is a bisector of an angle (in this example, 90°) formed by the calculation directions S1 and S2, a calculation direction S32 between the calculation directions S1 and S31, and a calculation direction S33 between the calculation directions S2 and S31, for example.

Moreover, in the case of the calculation direction S31, for example, "one line" includes all data elements on individual lines parallel to the calculation direction S31, and in FIG. 8, the data elements a1, a5, and a9 form one line, and the data elements a4 and a8 form one line. Moreover, when the calculation direction is slanted with respect to the scanning direction S1 as with the calculation direction S31 (excluding the orthogonal calculation direction S2), the number of data elements in one line is not constant, and as described above, in the case of the calculation direction S31, for example, the number of data elements in one line may be different, for example, two or three. It should be noted, however, that a case in which the number of data elements in one line is one is excluded from the calculation directions.

Incidentally, there are cases in which the user sees the second distribution image 202 of FIG. 6 line by line and decides that it is preferred to change the calculation direction S2 at some midpoint in some cases, and it is considered that there are more cases in which the calculation direction is modified after the user sees the second distribution image 202 than cases in which an optimal calculation direction is known from the start.

In this case, as illustrated in FIG. 9A, when three lines D1, D2, and D3 are displayed from the start of the measurement, and when the user sees the three lines and changes the calculation direction S2, a second distribution image 202$xy$ contains both of flat distribution images of the lines D1, D2, and D3 and distribution images of lines D4 to D6 calculated in the calculation direction S2, and it may be difficult to grasp the entire image calculated in the calculation direction S2 in some cases.

To address this problem, as illustrated in FIG. 9B, it is preferred to recalculate the second distribution image line by line in the calculation direction S2 also for the measurement data before the calculation direction S2 is changed (specified), and display the recalculated second distribution image together with the second distribution image (lines D4 to D6) in the calculation direction S2 after the specification.

In FIG. 9B, in the scanning direction S1 before the specification, three lines (D1 to D3) of the second distribution image of the measurement data are obtained, but when the calculation direction is slanted with respect to the scanning direction S1 as with the calculation direction S31 of FIG. 8, even when the measurement data is the same from the start of the measurement, the obtained number of lines of the second distribution image may not always be the same, and may be reduced to two lines (D11 and D12).

The processing in FIG. 9B may be performed as in Step S114 to Step S120 of FIG. 3.

First, the distribution image calculator 40$a$ determines, after Step S112, whether to recalculate the second distribution image before the specification of the calculation direction (Step S114).

In this case, whether to recalculate the second distribution image can be determined when, for example, the user inputs a request for the recalculation through the keyboard 42, and the distribution image calculator 40$a$ acquires the request. Alternatively, setting may be made to perform the recalculation by default.

When the determination is "Yes" in Step S114, the processing proceeds to Step S116, in which it is determined whether a flag to be described later is set. In Step S116, when the determination is "Yes", the processing proceeds to Step S104, and when the determination is "No", the processing proceeds to Step S118.

In Step S118, the distribution image calculator 40$a$ recalculates the second distribution image in the specified calculation direction based on the measurement data before the specification, and sets a flag indicating that the second distribution image has been recalculated.

Next, in Step S120, the display controller 40$b$ displays the second distribution image recalculated in Step S118 and the second distribution image after the specification of the calculation direction together on the monitor 41.

Subsequently to Step S120 or Step S104, in Step S130, the distribution image calculator 40$a$ determines whether the measurement data has ended. The processing is ended when the determination is "Yes", and the processing returns to Step S110 and is repeated when the determination is "No".

When the second distribution image is recalculated in the first Step S114, after the flag is set in S118, the second distribution image recalculated in Step S120 and the second distribution image after the specification of the calculation direction are displayed together. Next, in the second and subsequent Steps S114, with the flag indicating that the second distribution image has already been recalculated being set, the determination is "No", and the processing proceeds to Step S104 without performing further recalculation.

In other words, in FIG. 9B, for example, recalculated second distribution images D11 and D12 and second distribution images D4 to D6 after the calculation direction is specified are displayed together in the first Step S114, but second distribution images after the specification are added after D6 line by line in the second and subsequent Steps S114.

Next, referring to FIG. 10A, FIG. 10B, FIG. 11A, and FIG. 11B, the subtraction order is described.

As illustrated in FIG. 10A, when the second distribution image is calculated, the subtraction order for the difference between adjacent data elements includes: (1) calculating a difference D (=$a2-a1$) by subtracting the chronologically previous data element $a1$ from the chronologically subsequent data $a2$ on one line, and (2) calculating a difference –D (=$a1-a2$) in the order opposite to (1). Then, the difference D and the difference –D are inverted in highness/lowness, and has the effect of inverting lightness/darkness of the second distribution image. When the second distribution image based on the difference D is hard to see, and when the lightness/darkness is inverted to display the difference –D, the second distribution image may become easier to see in some cases. In this manner, the subtraction order can be selected depending on the purpose.

Therefore, when the second distribution image 202 is hard to see in the lines D1 to D3 in FIG. 7, for example, and when the user inputs a subtraction order through the keyboard 42, for example, the subtraction order specification module 40$d$ may set the subtraction order in the distribution image calculator 40$a$.

The adjacent data elements from which the difference D is determined are not limited to such a data sequence along the horizontal axis of FIG. 8 as in FIG. 10A, and may be such a data sequence along the vertical axis of FIG. 8 as in FIG. 10B, or a data sequence along a diagonal between the horizontal axis and the vertical axis, for example.

Differences of FIG. 10B based on data sequences along the vertical axis of FIG. 8 are hereinafter expressed as D' and –D'.

The processing in which the distribution image calculator 40$a$ recalculates the second distribution image in the subtraction order specified by the subtraction order specification module 40$d$ is similar to Step S110 to Step S120 (FIG. 3) performed in the specified calculation direction.

Figure 11A:
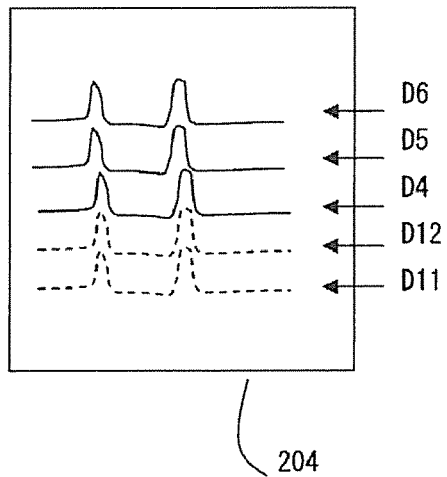
FIG. 11A and FIG. 11B are schematic diagrams for illustrating a mode in which, when a calculation direction and a subtraction order are both specified, recalculated second distribution images and second distribution images after the specification are displayed together.
Figure 11B:
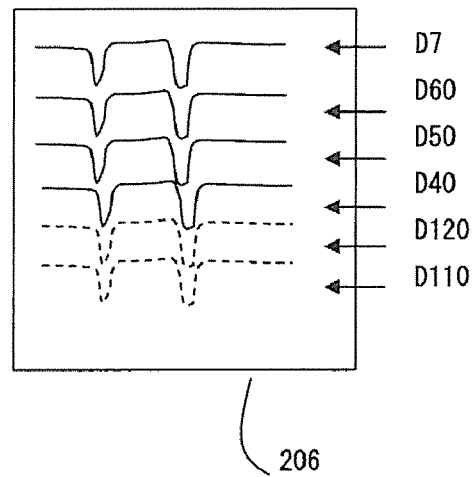

Moreover, as illustrated in FIG. 11A and FIG. 11B, both of the calculation direction and the subtraction order can be specified. In this case, in FIG. 11A, which corresponds to FIG. 9B, when the user sees the second distribution image (lines D11, D12, and D4 to D6) in the calculation direction S2 and makes a change from a subtraction order d corresponding to the difference D to a subtraction order –d corresponding to the difference –D, it is preferred that the second distribution image be recalculated in the subtraction order –d for the second distribution image (lines D11, D12, and D4 to D6) before the subtraction order, and be displayed together with the second distribution image (line D7 and subsequent lines) in the specified subtraction order. The second distribution image recalculated in the subtraction order −d is schematically illustrated as lines D110, D120, and D40 to D60.

In FIG. 12A to FIG. 12E and FIG. 13A to FIG. 13E, there are illustrated actual measurement examples of a first distribution image (shape image) and a second distribution image consisting of differences. In each of FIG. 12A to FIG. 12E, there is illustrated an image of a sample in which a plurality of wave-shaped ridge portions are aligned in parallel, and in each of FIG. 13A to FIG. 13E, there is illustrated an image of a sample in which a plurality of linear ridge portions are aligned in parallel.

Figure 12A:
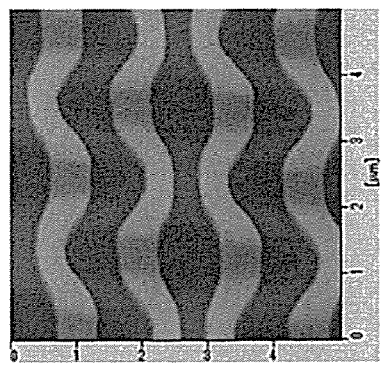
FIG. 12A, FIG. 12B, FIG. 12C, FIG. 12D, and FIG. 12E are diagrams for illustrating a first distribution image and second distribution images of an actual sample.
Figure 12B:
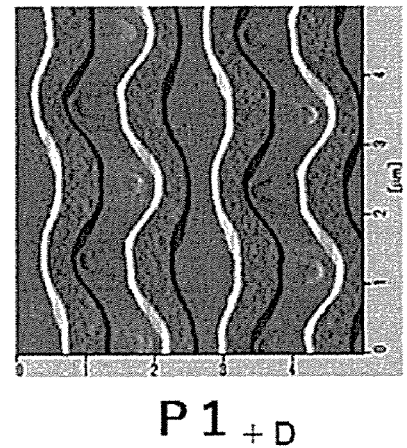
Figure 12C:
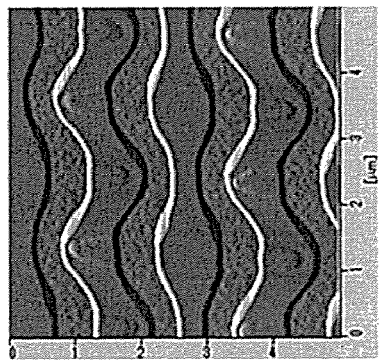

In FIG. 12A, a first distribution image (shape image) P1 is illustrated, and in FIG. 12B and FIG. 12C, second distribution images P1+D and P1−D obtained by taking differences +D and −D (see FIG. 10A) along the horizontal axis of FIG. 8 are illustrated, respectively.

Figure 12D:
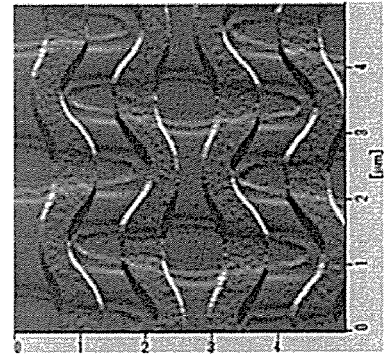
Figure 12E:
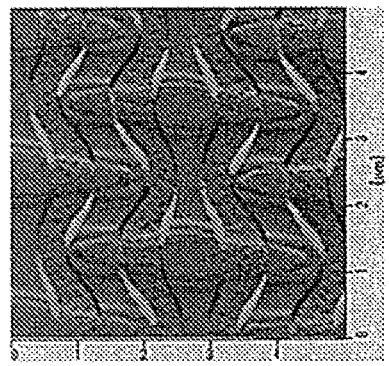
Figure 13A:
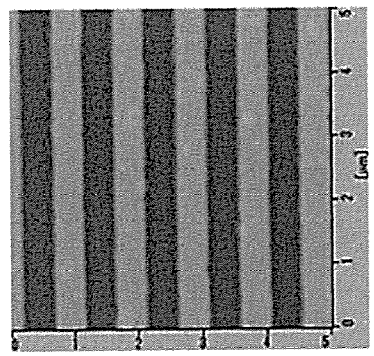
FIG. 13A, FIG. 13B, FIG. 13C, FIG. 13D, and FIG. 13E are other diagrams for illustrating a first distribution image and second distribution images of an actual sample.
Figure 13B:
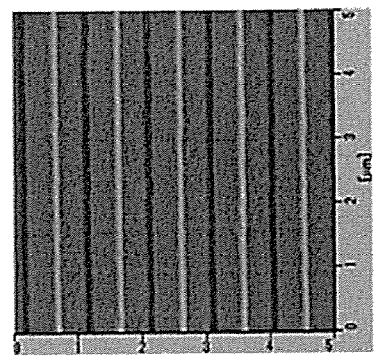
Figure 13C:
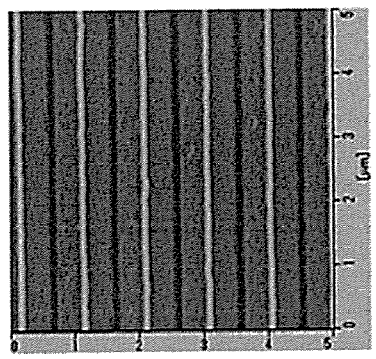
Figure 13D:
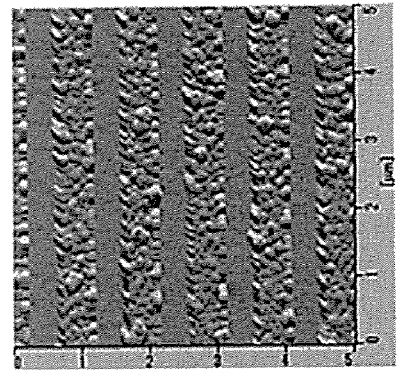
Figure 13E:
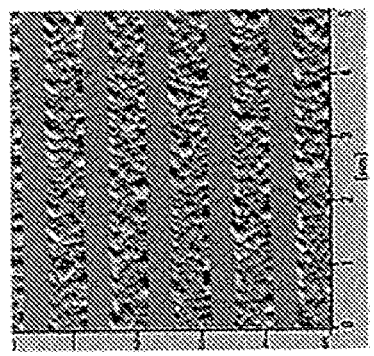

Meanwhile, in FIG. 12D and FIG. 12E, second distribution images $P1_{+D'}$ and $P1_{-D'}$ obtained by taking differences +D' and −D' (see FIG. 10B) along the vertical axis of FIG. 8 are illustrated, respectively.

The same applies to FIG. 13A to FIG. 13E, and each reference symbol P1 in FIG. 12A to FIG. 12E is replaced by a reference symbol P2.

It can be seen that highness/lowness (lightness/darkness) is inverted between the differences +D and −D, and that highness/lowness (lightness/darkness) is similarly inverted between the differences +D' and −D'. Therefore, when the second distribution image is obtained by taking predetermined differences as required, more information can be acquired.

In FIG. 7, FIG. 9A and FIG. 9B, and other figures, only the second distribution image is displayed. However, it should be understood that, when both of the first distribution image and the second distribution image are displayed in Step S104, the corresponding first distribution image is also recalculated in the specified calculation direction S2 as in FIG. 7, FIG. 9A and FIG. 9B, and other figures.

The present invention is not limited to the above-mentioned embodiment.

For example, in the above-mentioned embodiment, the case in which the measurement data is the shape data has been described, but the measurement data may be another physical quantity that can be measured by a scanning probe microscope. Moreover, in the above-mentioned embodiment, the DFM measurement mode has been described, but the present invention may be applied to a contact mode, for example. For example, the present invention may be applied when a friction image is measured in the contact mode.

Further, the present invention may also be applied to a lever scanning system in which the cantilever side of the scanning probe microscope is scanned for measurement.

What is claimed is:

1. A scanning probe microscope, comprising: a cantilever including a probe to be brought into contact with or closer to a surface of a sample; and a displacement detector configured to detect a signal indicating a displacement of the cantilever,
   the scanning probe microscope being configured to acquire measurement data obtained when a predetermined physical quantity between the cantilever and the surface of the sample is kept constant based on the signal, and when the probe is scanned relatively along the surface of the sample,
   the scanning probe microscope further comprising:
   a distribution image calculator configured to calculate a one-dimensional or two-dimensional first distribution image of the measurement data, and a one-dimensional or two-dimensional second distribution image of differential data of adjacent data elements of the measurement data; and
   a display controller configured to instruct the distribution image calculator to calculate at least one of the one-dimensional or two-dimensional first distribution image or the one-dimensional or two-dimensional second distribution image, and to display, on a predetermined display, the calculated at least one of the one-dimensional or two-dimensional first distribution image or the one-dimensional or two-dimensional second distribution image,
   wherein the display controller is configured to display, when displaying both of the one-dimensional or two-dimensional first distribution image and the one-dimensional or two-dimensional second distribution image, the measurement data and the differential data at the same position at the same time.

2. A scanning probe microscope according to claim 1, further comprising a calculation direction specification module configured to specify a data calculation direction, in which the one-dimensional or two-dimensional first distribution image and the one-dimensional or two-dimensional second distribution image are to be calculated,
   wherein the distribution image calculator is configured to calculate, along the data calculation direction specified by the calculation direction specification module, a distribution image to be displayed on the predetermined display, of the one-dimensional or two-dimensional first distribution image and the one-dimensional or two-dimensional second distribution image.

3. A scanning probe microscope according to claim 1, further comprising a subtraction order specification module configured to specify a subtraction order for a difference of adjacent data elements, in which the one-dimensional or two-dimensional second distribution image is to be calculated,
   wherein the distribution image calculator is configured to calculate the one- dimensional or two-dimensional second distribution image in the subtraction order specified by the subtraction order specification module.

4. A scanning probe microscope comprising:
   a cantilever including a probe to be brought into contact with or closer to a surface of a sample; and a displacement detector configured to detect a signal indicating a displacement of the cantilever,
   the scanning probe microscope being configured to acquire measurement data obtained when a predetermined physical quantity between the cantilever and the surface of the sample is kept constant based on the signal, and when the probe is scanned relatively along the surface of the sample,
   the scanning probe microscope further comprising:
   a distribution image calculator configured to calculate a one-dimensional or two-dimensional first distribution image of the measurement data, and a one-dimensional or two-dimensional second distribution image of differential data of adjacent data elements of the measurement data;
   a display controller configured to instruct the distribution image calculator to calculate at least one of the one-dimensional or two-dimensional first distribution image or the one-dimensional or two-dimensional second distribution image, and to display, on a predetermined display, the calculated at least one of the one-dimensional or two-dimensional first distribution image or the one-dimensional or two-dimensional second distribution image; and a calculation direction specification module configured to specify a data calculation direction, in which the one-dimensional or two-dimensional first distribution image and the one-dimensional or two-dimensional second distribution image are to be calculated, wherein the distribution image calculator is configured to calculate, along the data calculation direction specified by the calculation direction specification module, a distribution image to be displayed on the predetermined display, of the one-dimensional or two-dimensional first distribution image and the one-dimensional or two-dimensional second distribution image, the display controller is configured to display the one-dimensional or two-dimensional second distribution image sequentially for each element of the differential data along one of a scanning direction and the data calculation direction, and wherein the distribution image calculator is configured to calculate, when at least one of the data calculation direction or the subtraction order is specified by at least one of the calculation direction specification module or the subtraction order specification module during display of the one-dimensional or two-dimensional second distribution image, the one-dimensional or two-dimensional second distribution image based on the specified at least one of the data calculation direction or the subtraction order.

5. A scanning probe microscope according to claim 4, wherein the distribution image calculator is configured to recalculate the one- dimensional or two-dimensional second distribution image of the measurement data before the specification based on the specified at least one of the data calculation direction or the subtraction order, and wherein the display controller is configured to display both of the recalculated one-dimensional or two-dimensional second distribution image and the one-dimensional or two- dimensional second distribution image after the specification.

6. A scanning probe microscope according to claim 1, wherein the display controller is configured to display at least one of the measurement data or the differential data line by line in one of a scanning direction and the data calculation direction.

7. A scanning probe microscope, comprising: a cantilever including a probe to be brought into contact with or closer to a surface of a sample; and a displacement detector configured to detect a signal indicating a displacement of the cantilever, the scanning probe microscope being configured to acquire measurement data obtained when a predetermined physical quantity between the cantilever and the surface of the sample is kept constant based on the signal, and when the probe is scanned relatively along the surface of the sample, the scanning probe microscope further comprising:

a distribution image calculator configured to calculate a one-dimensional or two-dimensional first distribution image of the measurement data, and a one-dimensional or two-dimensional second distribution image of differential data of adjacent data elements of the measurement data;

a display controller configured to instruct the distribution image calculator to calculate at least one of the one-dimensional or two-dimensional first distribution image or the one-dimensional or two-dimensional second distribution image, and to display, on a predetermined display, the calculated at least one of the one-dimensional or two-dimensional first distribution image or the one-dimensional or two-dimensional second distribution image; and a subtraction order specification module configured to specify a subtraction order for a difference of adjacent data elements, in which the one-dimensional or two-dimensional second distribution image is to be calculated, wherein the distribution image calculator is configured to calculate the one-dimensional or two-dimensional second distribution image in the subtraction order specified by the subtraction order specification module, the display controller is configured to display the one-dimensional or two- dimensional second distribution image sequentially for each element of the differential data along one of a scanning direction and the data calculation direction, and the distribution image calculator is configured to calculate, when at least one of the data calculation direction or the subtraction order is specified by at least one of the calculation direction specification module or the subtraction order specification module during display of the one-dimensional or two-dimensional second distribution image, the one-dimensional or two-dimensional second distribution image based on the specified at least one of the data calculation direction or the subtraction order.

8. A scanning probe microscope according to claim 7, wherein the distribution image calculator is configured to recalculate the one-dimensional or two-dimensional second distribution image of the measurement data before the specification based on the specified at least one of the data calculation direction or the subtraction order, and wherein the display controller is configured to display both of the recalculated one-dimensional or two-dimensional second distribution image and the one-dimensional or two- dimensional second distribution image after the specification.

* * * * *